United States Patent
Aydin et al.

(10) Patent No.: US 10,109,121 B2
(45) Date of Patent: Oct. 23, 2018

(54) SYSTEM AND METHOD FOR ESTIMATING PART WEAR BASED ON ENVIRONMENT

(71) Applicant: Caterpillar Inc., Peoria, IL (US)

(72) Inventors: Saniye Gizem Aydin, Champaign, IL (US); Christopher Ha, Champaign, IL (US); David M. Longanbach, Peoria, IL (US); Arthur W. Scheck, Morton, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/454,112

(22) Filed: Mar. 9, 2017

(65) Prior Publication Data

US 2017/0270720 A1 Sep. 21, 2017

Related U.S. Application Data

(60) Provisional application No. 62/310,494, filed on Mar. 18, 2016.

(51) Int. Cl.
 *G07C 5/08* (2006.01)
 *E02F 9/26* (2006.01)
 *G05D 23/00* (2006.01)
 *G01S 19/13* (2010.01)
 *G07C 5/00* (2006.01)

(52) U.S. Cl.
 CPC ............ *G07C 5/0816* (2013.01); *E02F 9/267* (2013.01); *G05D 23/00* (2013.01); *G01S 19/13* (2013.01); *G07C 5/008* (2013.01)

(58) Field of Classification Search
 CPC ...... G07C 5/0816; G07C 5/0841; G07C 5/02; G07C 5/006; G01S 19/13; E02F 9/267
 See application file for complete search history.

(56) References Cited

U.S. PATENT DOCUMENTS

| | | | |
|---|---|---|---|
| 6,643,582 B2 * | 11/2003 | Adachi | E02F 9/20 340/988 |
| 8,073,653 B2 | 12/2011 | Suzuki et al. | |
| 8,463,460 B2 | 6/2013 | Sprock et al. | |
| 8,655,505 B2 | 2/2014 | Sprock et al. | |
| 8,688,332 B2 | 4/2014 | Reiners et al. | |
| 9,292,011 B2 * | 3/2016 | Suzuki | E02F 9/267 |
| 2005/0192860 A1 * | 9/2005 | Kouda | G06Q 10/06 705/7.22 |

(Continued)

*Primary Examiner* — Michael J Zanelli (57) ABSTRACT

A wear estimation system for a component of a machine includes a geolocation unit, a non-transitory computer-readable medium bearing a component wear estimate program, a controller, and an interface device. The geolocation unit is configured to generate a location signal indicative of a location of the machine. The controller is in operable communication with the geolocation unit to receive the location signal therefrom and is configured to execute the component wear estimate program. The interface device is configured to display a graphical user interface of the component wear estimate program. The component wear estimate program is configured to determine an estimated part life for the component based upon an environmental characteristic of the location; to track an actual usage amount for the component; and to indicate, through the graphical user interface, when the usage amount of the component exceeds a threshold percentage of the estimated part life.

20 Claims, 4 Drawing Sheets (56) References Cited

U.S. PATENT DOCUMENTS

2006/0217993 A1* 9/2006 Anderson .............. G06Q 10/10
 701/29.3
2007/0179640 A1 8/2007 Moughler
2008/0082345 A1 4/2008 Greiner et al.

* cited by examiner

SYSTEM AND METHOD FOR ESTIMATING PART WEAR BASED ON ENVIRONMENT

RELATED APPLICATIONS

This application is based upon and claims the benefit of priority from U.S. Provisional Application No. 62/310,494 by Saniye Gizem Aydin et al., filed Mar. 18, 2016, the contents of which are expressly incorporated herein by reference.

TECHNICAL FIELD

This patent disclosure relates generally to systems and methods for estimating part wear and, more particularly, to systems and methods for estimating part wear based upon one or more environmental factors.

BACKGROUND

Mobile machines are in widespread use in construction, mining, forestry, and other similar industries. These machines frequently have a track-type ground-engaging system rather than wheels. The undercarriage of such track-type machines includes track assemblies to provide ground-engaging propulsion. Such track assemblies may be preferred in applications where creating sufficient traction is problematic. Rather than rolling across a work surface on wheels, track-type machines utilize one or more track assemblies that include a loop of coupled track links defining exterior surfaces, which may themselves comprise, or be coupled to components that comprise, ground-engaging track shoes, and interior surfaces that travel about one or more rotatable track-engaging elements, such as, drive sprockets, idlers, tensioners, and rollers, for example, all of which may be considered to comprise the undercarriage of the track-type machine.

These track-type machines can be subjected to extremely harsh conditions which tend to put extreme wear on the undercarriage of the track-type machine. Accordingly, it is not uncommon for the undercarriage of a track-type machine (or components thereof) to require replacement from time to time. Specifically, it is known to service or replace a machine component, for example, when the component exceeds its expected lifetime (based on the age of the component or number of hours of in service use experienced by the component). Part wear can also be estimated using the material properties of the part.

Should a component fail while in service, a variety of problems can follow. For example, the failure of the component can cause the machine to be inoperable until it is repaired. The stalled machine may be in a position in which other machines cannot pass by the stalled machine to reach a part of the work site in which the other machines are needed. The stalled machine may be in a location where the machine is not easily accessible to perform the required maintenance. Further, such failures are often unpredictable and can occur at a time when maintenance operators are not readily available. Accordingly, the machine may be inoperable for a longer amount of time than it would otherwise be if the maintenance occurred as part of a planned schedule. Operating a component until it fails often causes secondary failures of one or more other components that are dependent upon the failed component. Thus, failure of a single component may cause increased down time and higher operating expenses for the overall operation of the machine.

On the other hand, under some conditions, the components of a machine may not need to be serviced or maintained as frequently as is normally scheduled. Accordingly, performing the scheduled maintenance may be wasteful because the components do not yet need to be serviced.

U.S. Patent Application Publication No. US2007/0179640 is entitled, "Environmental Monitoring System for a Machine Environment" and is directed to systems and methods for managing a machine environment based on environmental conditions associated with a machine. The method may include receiving one or more of environmental data and operation data associated with at least one machine operating at a job site associated with a machine environment. An aspect may also include determining one or more environmental conditions associated with the job site based on at least one of the environmental data and the operation data. An aspect may further include updating a project schedule based on the determined environmental conditions. There is a continued need in the art to provide additional solutions to enhance the ability to predict the service life of a component of a machine based on its actual usage at a worksite.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

In embodiments, the present disclosure describes a machine. The machine includes a frame, an undercarriage, a component, and a wear estimation system.

The undercarriage is mounted to the frame. The component comprises a part of, or is supported by, one of the frame and the undercarriage. The wear estimation system is supported by the frame. The wear estimation system includes a geolocation unit, a non-transitory computer-readable medium, a controller, and an interface device.

The geolocation unit is configured to generate a location signal. The location signal is indicative of a location of the machine. The location has an environmental characteristic.

The non-transitory computer-readable medium bears a component wear estimate program. The component wear estimate program includes a graphical user interface.

The controller is in operable communication with the geolocation unit to receive the location signal therefrom. The controller is in operable arrangement with the non-transitory computer-readable medium such that the controller is configured to execute the component wear estimate program contained thereon.

The interface device is in operable communication with the controller. The interface device is configured to display the graphical user interface of the component wear estimate program.

The component wear estimate program includes a wear estimate module, a tracking module, and a messaging module. The wear estimate module is configured to determine an estimated part life for the component based upon the environmental characteristic of the location of the machine. The tracking module is configured to track a usage amount for the component when the machine is in service. The messaging module is configured to display, through the graphical user interface, a maintenance indicator in the interface device when the usage amount of the component exceeds a first threshold percentage of the estimated part life.

In another embodiment, a wear estimation system for a component of a machine is described. The wear estimation system includes a geolocation unit, a non-transitory computer-readable medium, a controller, and an interface device.

The geolocation unit is configured to generate a location signal. The location signal is indicative of a location of the machine. The location has an environmental characteristic.

The non-transitory computer-readable medium bears a component wear estimate program. The component wear estimate program includes a graphical user interface.

The controller is in operable communication with the geolocation unit to receive the location signal therefrom. The controller is in operable arrangement with the non-transitory computer-readable medium such that the controller is configured to execute the component wear estimate program contained thereon.

The interface device is in operable communication with the controller. The interface device is configured to display the graphical user interface of the component wear estimate program.

The component wear estimate program includes a wear estimate module, a tracking module, and a messaging module. The wear estimate module is configured to determine an estimated part life for the component based upon the environmental characteristic of the location of the machine. The tracking module is configured to track a usage amount for the component when the machine is in service. The messaging module is configured to display, through the graphical user interface, a maintenance indicator in the interface device when the usage amount of the component exceeds a first threshold percentage of the estimated part life.

In still another embodiment, a method of estimating wear of a component of a machine is described. The method of estimating includes operating a geolocation unit to generate a location signal. The location signal is indicative of a location of the machine. The location has an environmental characteristic. The location signal is transmitted to a controller.

The controller is used to execute a component wear estimate program stored upon a non-transitory computer-readable medium to determine an estimated part life for the component based upon the environmental characteristic of the location of the machine. The controller is used to execute the component wear estimate program to track a usage amount for the component when the machine is in service. The controller is used to execute the component wear estimate program to display, through a graphical user interface, a maintenance indicator in an interface device when the usage amount of the component exceeds a first threshold percentage of the estimated part life.

Further and alternative aspects and features of the disclosed principles will be appreciated from the following detailed description and the accompanying drawings. As will be appreciated, the systems and methods of estimating wear of a component disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Embodiments of component wear estimation systems and methods are disclosed herein. In embodiments, a machine can include an onboard wear estimation system configured to determine an estimated part life for one or more components of the machine based upon at least one environmental characteristic of the location at which the machine is located. In embodiments, a method of estimating wear of a component of a machine following principles of the present disclosure can be used to determine a more accurate estimate of a component's part life based upon the actual conditions in which the machine is operated.

In embodiments, a reference estimated part life of a component can be determined using the material properties of the part and/or historical data for the component. In embodiments, the component wear estimation system can be configured to determine an estimated part life for the component of the machine by adjusting the reference estimated part life based upon environmental conditions, such as soil and/or weather characteristics, present at the location at which the machine is located which have been identified as being statistically significant to the service life of the component. The component wear estimation system can be configured to utilize this information to determine an estimated part life of the respective component based upon at least one environmental characteristic of the location of the machine at which it is operated.

In embodiments, a method of estimating wear of a component following principles of the present disclosure uses weather data (precipitation, humidity etc.) and/or soil data (soil type, sand content, acidity, granularity, etc.) for a particular location at which the machine is located to estimate the part life of machine components. The location of the machine can be determined using a geolocation unit. A database of environmental data can be accessed to determine at least one environmental characteristic associated with the location. Once the location of the machine and the environmental data is connected, the relationship between the component wear rate and the environmental data can be analyzed to determine an estimated part life of the component based upon the environmental characteristic of the location of the machine.

In embodiments, a method of estimating wear of a component following principles of the present disclosure evaluates differences in component wear in machines operating in varied environmental conditions. Part wear data can be merged with environmental data (such as, soil and weather data) linked to the machine's location. Actual component wear observations can be linked to soil and weather data for the location in which the usage occurred. Environmental characteristics can include soil pH, soil sand content, soil texture, and soil granularity (or size), for example. The location of the machine can be identified. The wear rate based on at least one environmental condition of the machine's location can be estimated. The usage of the component at the location can be tracked. In embodiments, the usage amount of the component can be expressed in any suitable manner, such as, in usage time (e.g., run time of the component of the machine) and/or in usage distance (e.g., movement of the machine). A message can be issued to one or more devices when the usage of the component exceeds a predetermined threshold of the estimated part life so that the component can be timely replaced before failure while using the component to near its estimated part life.

Figure 1:
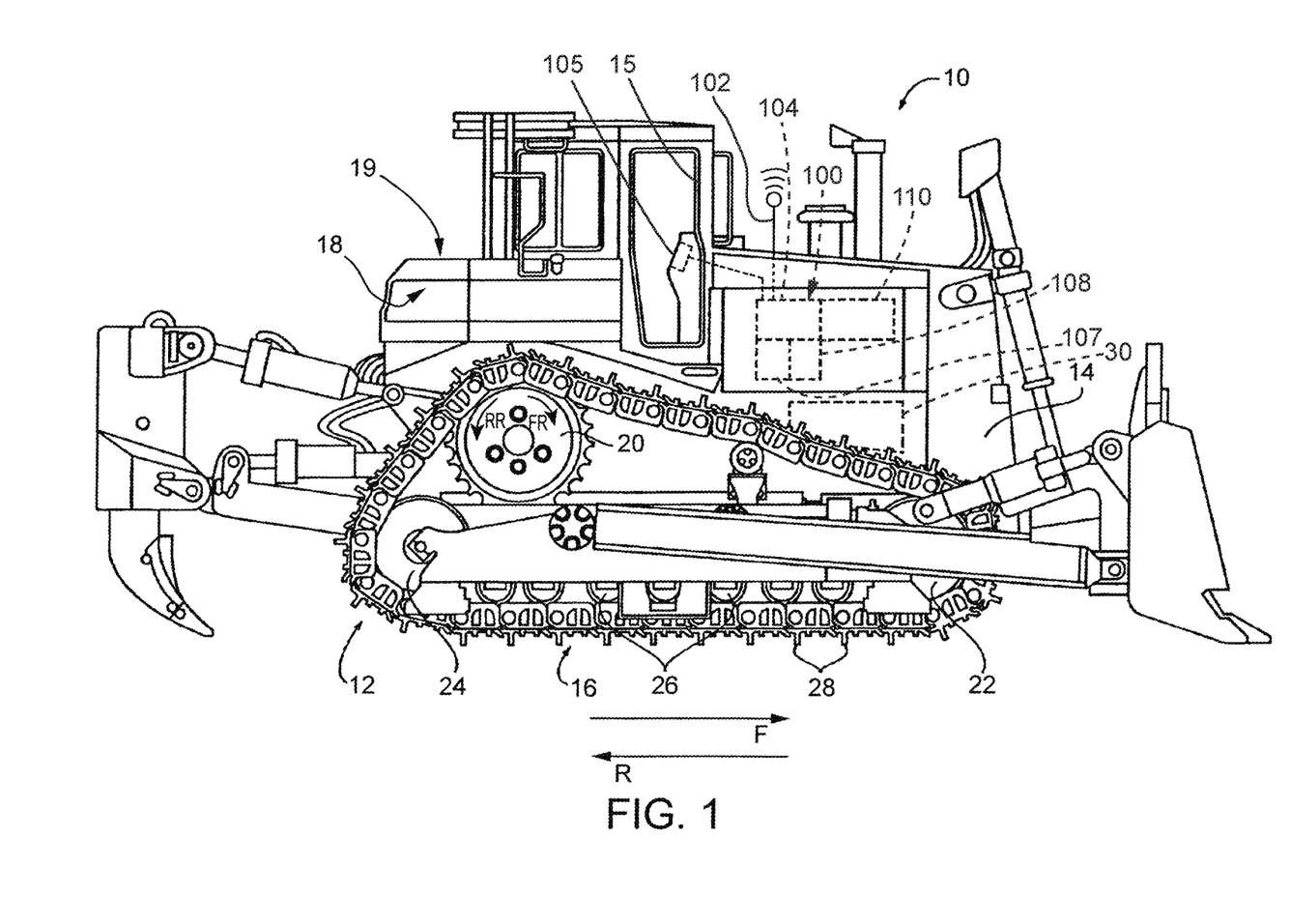
FIG. 1 is a diagrammatic side elevational view of an embodiment of a track-type machine which includes an embodiment of a component wear estimation system constructed in accordance with principles of the present disclosure.

Turning now to the Figures, there is shown in FIG. 1 an exemplary embodiment of a machine 10 constructed according to principles of the present disclosure which includes a track-type undercarriage 12 mounted to a frame 14. The machine 10 may also be referenced herein as a track-type machine.

In other embodiments, the principles disclosed herein can be incorporated and used with other suitable machines, such as machines that are used in industries including mining, construction, forestry, farming, etc. Non-limiting examples of other mobile machines that can be constructed according to principles of the present disclosure include commercial machines, such as trucks, cranes, earth moving vehicles, mining vehicles, cold planers, dozers, wheel loaders, backhoes, motor graders, track type tractors, hydraulic excavators, track type loaders, material handling equipment, farming equipment, marine vessels, aircraft, and other types of movable machines.

The machine 10 is adapted to be controlled by an operator. An operator compartment 15 is supported by the frame 14 and is configured to hold one or more operators therein during operation of the machine 10.

The undercarriage 12 of the machine 10 a first track chain assembly 16 disposed on a first side 18 of the frame 14, and a second track chain assembly (not shown) disposed on a second side 19 thereof. The second side 19 is in opposing relationship to the first side 18. Together, the first and second track assemblies 16 are adapted to engage the ground, or other surface, to propel the machine 10.

It should be appreciated that the track assemblies of the machine 10 may be similar and, further, may represent mirror images of one another. As such, only the first track chain assembly 16 will be described herein. It should be understood that the description of the first track chain assembly 16 is applicable to the second track chain assembly, as well.

The first track chain assembly 16 extends about a plurality of rolling elements such as a drive sprocket 20, a front idler 22, a rear idler 24, and a plurality of track rollers 26. The track chain assembly 16 includes a plurality of ground-engaging track shoes 28 for engaging the ground, or other surface, and propelling the machine 10.

During typical operation of the undercarriage 12, an engine 30 of the machine is operated to drive the drive sprocket 20 in a forward rotational direction "FR" to drive the track chain assembly 16, and thus the machine 10, in a forward direction "F," and in a reverse rotational direction "RR" to drive the track chain assembly 16, and thus the machine 10, in a reverse direction "R." The drive sprockets 20 of the undercarriage 12 can be independently operated to turn the machine 10.

Figure 2:
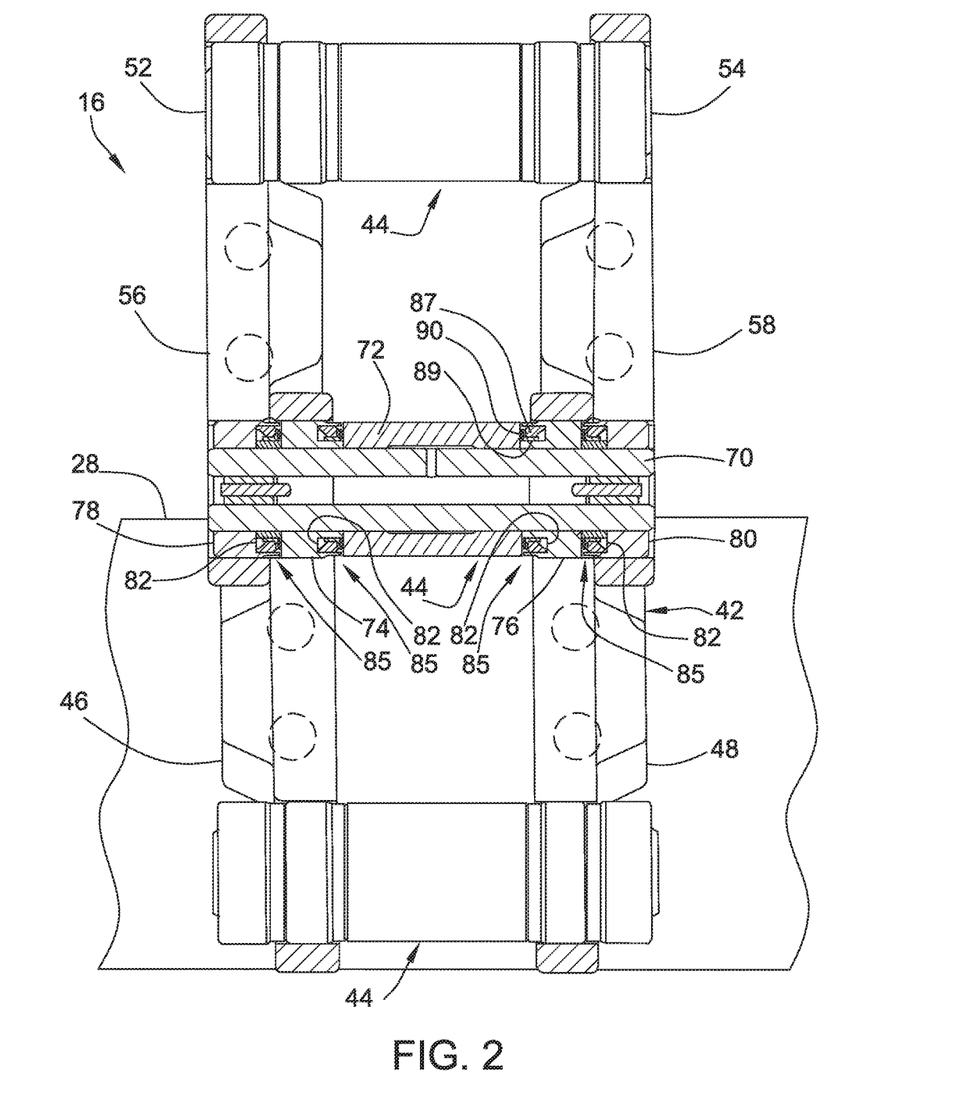
FIG. 2 is a top plan view of a portion of an embodiment of a track chain assembly including a plurality of different components suitable for use with an embodiment of a component wear estimation system constructed in accordance with principles of the present disclosure.

Referring now to FIG. 2, the first track chain assembly 16, only a portion of which is shown, includes a plurality of subassemblies 42. Each subassembly 42 includes a track pin cartridge assembly 44, an inner link 46, an outer link 48, and a track shoe 28 connected to the inner and outer links 46, 48. A number of subassemblies 42 are mechanically coupled to adjacent subassemblies 42 so that, when an appropriate number of these subassemblies 42 are connected together, the first track chain assembly 16 is formed. The first track chain assembly 16 has a predetermined length for a given application with opposite ends that are capable of being connected together to form a closed loop. The closed loop is formed by mechanically coupling the opposite ends together with an inner master link 52 and outer master link 54 to respectively provide an inner chain 56 of a series of inner links 46 and an outer chain 58 of a series of outer links 48 coupled together via a plurality of track pin cartridge assemblies 44.

The track pin cartridge assembly 44 is illustrated according to one of several possible embodiments suitable for use with the present disclosure. The illustrated track pin cartridge assembly 44 includes a track pin 70, a bushing 72, first and second bearing members 74, 76, and first and second collars 78, 80. As is well known in the art, the components of the track pin cartridge assembly 44 can define a plurality of annular seal cavities 82 that extend around the track pin 70 and are each adapted for housing therein a seal assembly 85 suitable for sealingly engaging relatively rotating components of the track pin cartridge assembly 44. The illustrated sealing assemblies 85 each includes a load ring 87, a seal ring 89 engaged with the load ring, and a sealing lip 90 mounted to the seal ring 89.

Referring to FIG. 1, the machine includes an embodiment of a wear estimation system 100 constructed according to principles of the present disclosure. The wear estimation system 100 is configured to determine an estimated part life of at least one component of the machine 10. In embodiments, the wear estimation system 100 is configured to determine an estimated part life of a component that comprises a part of, or is supported by, one of the frame 14 and the undercarriage 12. For purposes of illustration only, in the present disclosure the component will be considered to be the track roller 26.

In embodiments, the component 26 can be any other suitable component of the machine 10 (such as, one or more components of the undercarriage 12 or the frame 14, for example). In embodiments, the wear estimation system 100 can be configured to determine an estimated part life of a component that comprises an assembly of parts, such as the track pin cartridge assembly 44, for example.

The wear estimation system 100 is supported by the frame 14. The wear estimation system includes a geolocation unit 102, a controller 104, an interface device 105, a data storage device 107, a non-transitory computer-readable medium 108 bearing a component wear estimate program thereon, and a communication device 110.

Figure 3:
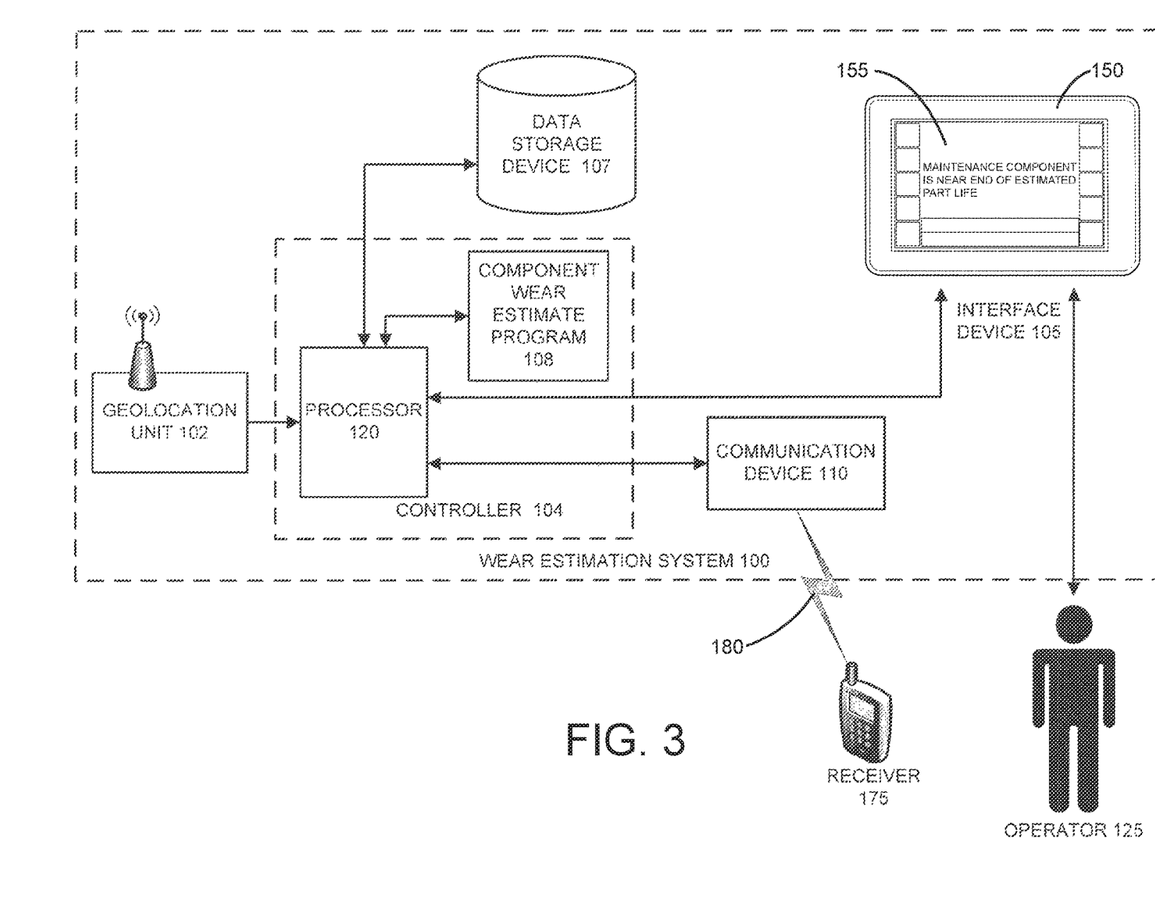
FIG. 3 is a schematic and diagrammatic view of an embodiment of a component wear estimation system constructed in accordance with principles of the present disclosure.

Referring to FIG. 3, there is shown a schematic and diagrammatic view of the wear estimation system 100 of the machine 10. The geolocation unit 102 is configured to generate a location signal. The location signal is indicative of a location of the machine 10. The location can be associated with one or more environmental characteristics that affect the part life of the component 26.

In embodiments, the geolocation unit 102 can comprise any suitable device configured to determine the location of the machine 10 and to send a location signal indicative of an absolute location (including, e.g., latitude, longitude, and altitude information) of the machine 10 to the controller 104. For example, in embodiments, the geolocation unit comprises a Global Positioning System (GPS) receiver. In embodiments, the GPS receiver 102 is configured to generate a location signal that includes a latitudinal position and a longitudinal position.

In other embodiments, the geolocation unit 102 can comprise a portion of an Inertial Reference System (IRS), a local tracking system, or another known locating system that receives or determines positional information associated with the machine 10. Suitable technologies for geolocation include, but are not limited to, the U.S. Global Positioning System, the Russian GLONASS satellite-based system, the European Galileo satellite-based system, and radio-positioning systems provided by Locata Corporation of Canberra, Australia, for example. In embodiments, the geolocation unit 102 can be configured to receive and process geolocation signals from multiple systems to generate the location signal sent to the controller 104. In some embodiments, the location signal generated by the geolocation unit 102 can be conveyed to a remotely-located central station via the communication device 110 to convey signals indicative of the received or determined positional information of the machine 10 for further processing.

The controller 104 is in operable communication with the geolocation unit 102 to receive the location signal therefrom. The controller 104 is in operable arrangement with the non-transitory computer-readable medium 108 such that the controller 104 is configured to execute the component wear estimate program contained thereon. The controller 104 is also operably arranged with the interface device 105, the data storage device 107, and the communication device 110.

The controller 104 can include a processor 120 and be programmed with the component wear estimate program 108 contained upon the non-transitory, tangible computer-readable storage medium. When executed by the processor 120, the component wear estimate program 108 provides the controller 104 with the functionality to determine an estimated part life for the component 26 based upon at least one environmental characteristic of the location and to provide component wear life information to an operator 125 via the interface device 105.

In embodiments, the processor 120 can generally include any component of an application that can receive input from a client or the interface device 105, process the input, present the input to the component wear estimate program 108, and present output from the processor 120 to the client, the interface device 105, and/or to the data storage device 107, and execute logic for the component wear estimate program 108. In embodiments, the controller 104 can include one or more processors that can execute instructions and process data to perform one or more functions associated with the wear estimation system 100. For instance, the controller 104 can execute software that enables the wear estimation system 100 to request and/or receive operation and/or environmental data from outside of the wear estimation system 100. The controller 104 can also execute software that enables the wear estimation system 100 to determine one or more environmental characteristics of the location at which the machine 10 is located.

The non-transitory computer-readable medium 108 bears the component wear estimate program. The component wear estimate program 108 is configured to determine an estimated part life for the component 26 based upon at least one environmental characteristic of the location at which the machine 10 is located. In embodiments, the component wear estimate program includes a graphical user interface, a wear estimate module, a tracking module, and a messaging module.

The wear estimate module is configured to determine an estimated part life for the component based upon the environmental characteristic of the location of the machine. In embodiments, any suitable environmental characteristic(s) of the location can be used to determine the estimated part life. For example, in embodiments, the environmental characteristic comprises a soil condition. In at least some embodiments, the soil condition comprises a soil granularity for the location. In embodiments, the environmental characteristic comprises a weather condition. In at least some embodiments, the weather condition comprises an average precipitation value for the location over a predetermined period of time. In some embodiments, the wear estimate module determines the estimated part life for the component 26 based upon both a soil condition and a weather condition of the location.

In embodiments, the wear estimate module of the component wear estimate program is configured to determine the estimated part life based upon a database of time-to-full-wear values stored in the data storage device 107. In embodiments, the wear estimate module of the component wear estimate program is configured to correlate the location of the machine with one of a plurality of geographic regions and to identify the environmental characteristic for determining the estimated part life using a database of environmental characteristic data for the plurality of geographic regions stored in the data storage device 107.

The tracking module is configured to track a usage amount for the component when the machine is in service. In embodiments, an on-board module can be configured to be in communication with the controller 104 such that the on-board module transmits information to the controller 104 concerning the service operation of the component 26 such that the controller 104 can track the usage amount of the component 26. The on-board module can be interconnected with a variety of other modules and/or sensors as will be appreciated by one skilled in the art. For example, an on-board module can include an Engine Control Module (ECM), a power system control module, an attachment interface that connects one or more sub-components, and any other type of device that the machine 10 can use to facilitate and/or monitor operations of the machine 10 during run time or non-run time conditions (i.e., the engine 30 running or not running, respectively) to track a usage amount of the component. In such embodiments, the controller 104 can be adapted to respond to signals received from the sensors either directly or indirectly through the on-board module.

In embodiments, the controller 104 is adapted to assemble a maintenance indicator (such as in the form of a first pop-up message) from data in the data storage device 107 in response to receiving an indication from the tracking module of the component wear estimate program 108 that the usage amount of the component 26 exceeds a first threshold percentage of the estimated part life. The messaging module is configured to display, through the graphical user interface, a maintenance indicator in the interface device 105 when the usage amount of the component 26 exceeds a first threshold percentage (e.g., eighty percent) of the estimated part life. The controller 104 can transmit the maintenance indicator to the interface device 105 for display to the operator 125 via the graphical user interface of the component wear estimate program 108. The first pop-up message can include data describing the first maintenance condition.

In embodiments, the controller 104 is adapted to assemble a warning indicator from data in the data storage device 107 in response to receiving an indication from the tracking module of the component wear estimate program that the usage amount of the component 26 exceeds a second threshold percentage (e.g., ninety percent) of the estimated part life, which is higher than the first threshold percentage that triggers the maintenance indicator. In embodiments, the warning indicator includes at least one of a visible image (such as a second pop-up message displayed by the graphical user interface in the interface device 105) and an audible sound. In embodiments, the first percentage and the second percentage can be any desired values, such as, e.g., eighty percent and ninety percent, respectively.

The interface device 105 is in operable communication with the controller 104. The interface device 105 is configured to display the graphical user interface of the component wear estimate program 108. The interface device 105 is coupled to the controller 104 to receive estimated part life data. In the illustrated embodiment, the interface device 105 is adapted to provide information in the form of visibly-displayed indicia. In embodiments, an audio device can be associated with the interface device 105 to provide audibly-perceptible information through a speaker.

In embodiments, the component wear estimate program 108 can be configured such that the interface device 105 can display the usage amount of the component 26 as a percentage of the estimated part life used, a percentage of the estimated part life remaining, and/or hours of usage remaining, for example. In embodiments, the component wear estimate program 108 can be configured such that the interface device 105 can display a maintenance status of the component 26. The maintenance status can be configured to indicate that service of the component is required when a determined percentage of the estimated part life determined by the component wear estimate program 108 is used.

The operator 125 can use the interface device 105 to receive information from the component wear estimate program 108 and to provide inputs to the controller 104 through the interface device 105. The interface device 105 can be configured to provide the operator 125 with an operable interface to other systems of the machine 10.

The interface device 105 can include hardware and/or software components configured to allow the operator 125 to access information stored in the data storage device 107. For example, the graphical user interface of the component wear estimate program 108 can include a data access interface configured to allow the operator 125 to access, configure, store, and/or download information to an off-board system or a receiver 175, such as a computer, a personal digital assistant (PDA) or smart phone using a particularly-configured mobile application ("app"), a diagnostic tool, or any other type of data device. Moreover, the interface device 105 can be configured to allow the operator 125 to access and/or modify information, such as operational parameters, operating ranges, reference part life information, environmental data for a variety of locations, and/or threshold levels associated with one or more component configurations, stored in the data storage device 107.

In the illustrated embodiment, the interface device 105 is mounted within the operator compartment 15 (see FIG. 1).

In other embodiments, the interface device 105 can be located elsewhere, including a location remote from the machine 10.

The illustrated embodiment of the interface device 105 comprises a liquid crystal display device 150. In embodiments, the liquid crystal display device 150 can be mounted within a panel configuration in the operator compartment 15 or as a stand-alone device.

In embodiments, the interface device 105 can comprise another type of display, a console, a keyboard, push buttons, voice recognition devices, a laptop computer, speakers, and/or other interfaces, as will be appreciated by one skilled in the art. In embodiments, the interface device 105 can include any type of display device that presents information.

The illustrated liquid crystal display device 150 includes a display screen in the form of a touch screen 155 adapted to display information to the operator 125 of the machine 10 and to receive instructions from the operator 125 for transmission to the controller 104 via finger touch input. The touch screen 155 can include a message display section adapted to selectively display a plurality of pop-up messages, such as those generated by the controller 104 using the wear estimate program 108. In other embodiments, the interface device 105 can include a different type of display screen.

The touch screen 155 can be any suitable size, such as a seven-inch screen, for example, with any suitable aspect ratio, such as 1.66:1 or industry reference "Super 16," for example. The touch screen 155 can be selectively activated using capacitive-touch technology as is well known to those skilled in the art. The touch screen 155 can be configured to detect anything which is conductive or has a dielectric different from that of air. In embodiments, the touch screen 155 can be activated based on a human finger touch applying a predetermined amount of force to the touch screen 155. In embodiments, the touch screen 155 can be configured to respond to immediate touch activation, push and hold activation, and activation upon lift off. In embodiments, the brightness and/or color of the background of the display screen 155 can be adjusted. For example, in some embodiments, the display screen 155 can be toggled between a day mode and a night mode, for example. The day mode can have a different color scheme and/or brightness than the night mode.

The data storage device 107 is in operable communication with the controller 104. The data storage device 107 can generally include any type of system for storing data in non-volatile storage. This includes, but is not limited to, systems based upon: magnetic, optical, and magneto-optical storage devices, as well as storage devices based on flash memory and/or battery-backed up memory. The data storage device 107 can include a removable memory module, or a fixed memory module, or a combination of removable and fixed memory modules.

The data storage device 107 can include one or more memory devices that store, organize, sort, filter, and/or arrange data used by the component wear estimate program 108. For example, in embodiments, the data storage device 107 includes a database of environmental characteristic data for a plurality of geographic regions. The wear estimate module of the component wear estimate program 108 can be configured to correlate the location of the machine 10 with one of the plurality of geographic regions and to identify the environmental characteristic using the database of environmental characteristic data for the geographic region within which the machine 10 is located.

In embodiments, any suitable statistical analysis technique can be used to identify the environmental characteristic(s) of a region that affect part life. For example, in embodiments, a statistically significant difference can be identified when the 80% confidence interval of the mean of two comparative scenarios are non-overlapping.

In embodiments, the data storage device 107 includes a database of weather condition data generated by a plurality of weather stations distributed over a plurality of geographic regions. In embodiments, the wear estimate module of the component wear estimate program 108 can be configured to correlate the location of the machine 10 with one of the plurality of geographic regions and to identify the environmental characteristic using the database of weather condition data for the geographic region within which the machine 10 is located. To identify which weather station data should be used for a machine, the machine's location is compared to the locations of the weather stations, and the weather station that is located to the machine is used.

In embodiments, the data storage device 107 includes a database of soil characteristic data for a plurality of geographic outline areas called map units. The map units describe soils and other components that have unique properties, interpretations, and productivity. An example of such a collection of map units is the General Soil Map of the United States, or "STATSGO2." A map unit is composed of one or more map unit components. A map unit component is composed of one or more soil horizons or layers. In embodiments, the database of soil characteristic data is comprised of general soil association units and is maintained as a spatial and tabular dataset. The wear estimate module of the component wear estimate program 108 can be configured to correlate the location of the machine 10 with one of the plurality of map soil units and to identify the environmental characteristic using the database of soil characteristic data for the map soil unit within which the machine 10 is located.

In embodiments, the database of soil characteristic data can include any suitable soil characteristic attributes. For example, in embodiments, the database of soil characteristic data includes data corresponding to the component (component), the component month (comonth), the component soil temperature (cosoiltemp), the component surface fragments (cosurffrags), the horizon (chorizon), the horizon texture (chtexture), the horizon texture group (chtexturegrp), and the horizon texture modifier (chtexturemod) from the Soil Data Mart Database from the United States Department of Agriculture.

In embodiments, the data storage device 107 includes a database of environmental characteristic data for a plurality of geographic regions that includes both soil and weather characteristics. For example, the database can include soil information for the geographic regions concerning the granularity of the soil; the presence of sand, silt, and clay in the soil; the ph of the soil; the texture description, class, and modifier of the soil. The database can also include weather information for the geographic regions concerning the temperature (e.g., average temperature), precipitation (e.g., average rainfall and total rainfall), and humidity (e.g., the dew point depression). The wear estimate module of the component wear estimate program 108 can be configured to correlate the location of the machine 10 with one of the plurality of geographic regions and to identify the environmental characteristic using the database of environmental characteristic data for the geographic region within which the machine 10 is located.

For example, in embodiments, the wear estimate module can determine the estimated part life by determining in which category or categories are the environmental characteristics of the location of the machine 10 as follows in Table I:

TABLE I

| Variable | Category | Parameter |
|---|---|---|
| % Sand | High | >70% sand |
|  | Low | <70% sand |
| % Clay | High | >30% clay |
|  | Low | <30% clay |
| pH | Acid | <5.0 pH |
|  | Neutral | 5.0 < pH < 7.0 |
|  | Alkaline | >7.0 pH |

Soil factors such as acidity/alkalinity, sand content, and soil moisture (as estimated by rainfall and other precipitation) were seen to have statistically significant and meaningful impacts on wear rates. For example, in embodiments, the wear estimate module can determine that the estimated part life is increased relative to a mean reference part life when the location has an alkaline soil and is impacted when the location has an acid soil. For example, the acidity level can affect the hour-to-full wear value by several hundred hours.

In embodiments, the data storage device 107 includes a database of time-to-full-wear values for a plurality of components installed in a corresponding set of other machines. For a given component, the time-to-full-wear value can be calculated using the following equation:

$$\text{Time To Full Wear} = \frac{100\%}{\Delta\% \text{ Wear}/\Delta time}$$

where Δ% Wear/Δtime is calculated as a wear percentage difference between a pair of wear measurements of that component divided by a usage time difference between the pair of wear measurements. In embodiments, the database of time-to-full-wear values can be organized by the location of each component in the data and/or by the environmental characteristic(s) to which the component was exposed during service.

In embodiments, percent-wear-per-hour is calculated by dividing the change in wear between measurements by the change in usage hours between measurements. Percent-wear-per-hour can be converted into the scale-standardized metric Hour-to-full-wear. Hour-to-full-wear can be used to find the estimated number of hours until complete (one hundred percent) wear occurs based upon the actual measured observations used to calculate Percent-wear-per-hour. In embodiments, the database of time-to-full-wear values for a plurality of components includes the wear observation details set forth in Table II below:

TABLE II

| Wear Observation Detail | |
|---|---|
| Serial Number | Identifies machine |
| Current Date | Identifies specific observation |
| Previous Inspection Date | Defines operational period |
| % Wear Measurement | Captured by inspection |
| Hours between inspections | Captured by entered hour meter readings |
| Hours to full Wear | Calculated from wear measurements and hour meter readings |

In embodiments, the wear rate per component data is stored by machine serial number. Each measurement can be composed of one or more measurements. In embodiments, a given component can have a plurality of time-to-full-wear values associated with it. In embodiments, all of the time-to-full-wear values for a given component can be used to determine a composite time-to-full-wear value for that component. For example, the composite time-to-full wear value for a given component can be calculated as the average of all of the time-to-full-wear values for that component. The wear estimate module of the component wear estimate program 108 can be configured to determine the estimated part life based upon the database of time-to-full-wear values.

In embodiments, the data storage device 107 includes a database of designed component life data for a plurality of components installed in the machine 10. The component wear estimate program 108 can be configured to determine the estimated part life based upon a comparison of the effect of at least one environmental characteristic of the machine's and the data from the database of designed component life data for the component 26.

It will be appreciated that, in embodiments, the component wear estimate program 108 can be configured such that the particular environmental characteristic(s) used to determine estimated part life for the component 26 varies from location to location. In embodiments, the component wear estimate program 108 can be configured such that the particular environmental characteristic(s) used to determine estimated part life varies from component to component at a particular location of the machine 10.

In embodiments, the data storage device 107 can be adapted to store message data for use by the controller 104 in generating a message indicator and/or a warning indicator (such as in the form of at least one pop-up message). In embodiments, the data storage device 107 stores message data for a plurality of pop-up messages. The data storage device 107 can be adapted to store part life, performance, and duty cycle history data for a plurality of components of the machine 10; operator-specific information; location-specific information; machine-specific information; environmental characteristic data for a plurality of locations in which the machine is intended to be located; and any other type of information associated with the machine 10 and/or a geographical area associated with the location of the machine 10.

In embodiments, the data storage device 107 stores estimated part life data and component usage data generated by the component wear estimate program 108. In embodiments, to the extent that the machine 10 moves to a new location at which the particular environmental conditions of the new location differ from the previous location such that the estimated part life for the component 26 is different based upon the environmental characteristic(s) at the new location, the component wear estimate program 108 can update the estimated part life data for each such affected component of the machine 10. When the component 26 is repaired or replaced, the controller 104 can reset the information in the data storage device 107 to reflect the new or repaired state of the component 26 and to adjust the usage amount of the component 26 in a corresponding manner.

In response to a command received from the interface device 105, for example, the controller 104 can be used to display the current usage amount and the remaining estimated part life for the component 26 through the graphical user interface of the component wear estimate program 108 via the interface device 105. The information in the data storage device 107 can be selectively transmitted to the operator 125 via the interface device 105 and/or to the off-board receiver 175 via the communication device 110.

The communication device 110 is in operable arrangement with the controller 104 to communicatively transmit information from the wear estimation system 100 to a suitable, off-board device, such as the receiver 175, for example. In embodiments, the communication device 110 is configured to transmit a wear estimate signal indicative of at least one of the estimated part life of the component 26, the usage amount of the component 26, and the maintenance indicator to the receiver 175, which is unsupported by the frame 14 of the machine 10.

In embodiments, the communication device 110 can comprise any suitable equipment that facilitates the transmission of data between the wear estimation system 100 and an off board device, such as the receiver 175 or a central computer system located remotely from the machine 10.

In embodiments, the communication device 110 can include hardware and/or software configured to send and/or receive data through a wireless communication link 180 across a wireless networking platform such as, for example, a satellite communication system. Alternatively and/or additionally, the communication device 110 can include one or more broadband communication platforms configured to communicatively couple the wear estimation system 100 to an off board system, such as, for example, cellular, Bluetooth, microwave, point-to-point wireless, point-to-multipoint wireless, multipoint-to-multipoint wireless, or any other appropriate communication platform for networking a number of components.

In embodiments, the communication device 110 can be configured to establish a direct data link with an external data storage device. In embodiments, the external data storage device can be a part of the central computer system or in the form of a portable device for downloading the data from the wear estimation system 100 and uploading the information to the central computer system, for example. In embodiments, the communication device 110 can include a wired network, such as, for example, Ethernet, fiber optic, waveguide, or any other type of wired communication network.

In embodiments, the communication device 110 uses a cellular network to transmit estimated part life and/or usage data for one or more components of the machine 10 to the receiver 175 which is in the form of a smart phone having a mobile app loaded thereon to visibly display the estimated part life and/or usage data. In embodiments, the mobile app can be used to display the graphical user interface of the component wear estimate program 108 on the smart phone 175 to allow a user to input commands to the wear estimation system 100 remotely using the smart phone 175 and to receive output therethrough in a manner similar to that using the interface device 105.

In embodiments, the central computer system is configured to perform additional estimated part life analysis remotely from the machine 10 and to transmit the additional estimated part life data back to the wear estimation system 100 for further use in operating and maintaining the machine 10. In addition, the central computer system can be configured to monitor and service a fleet of machines at a central location.

Figure 4:
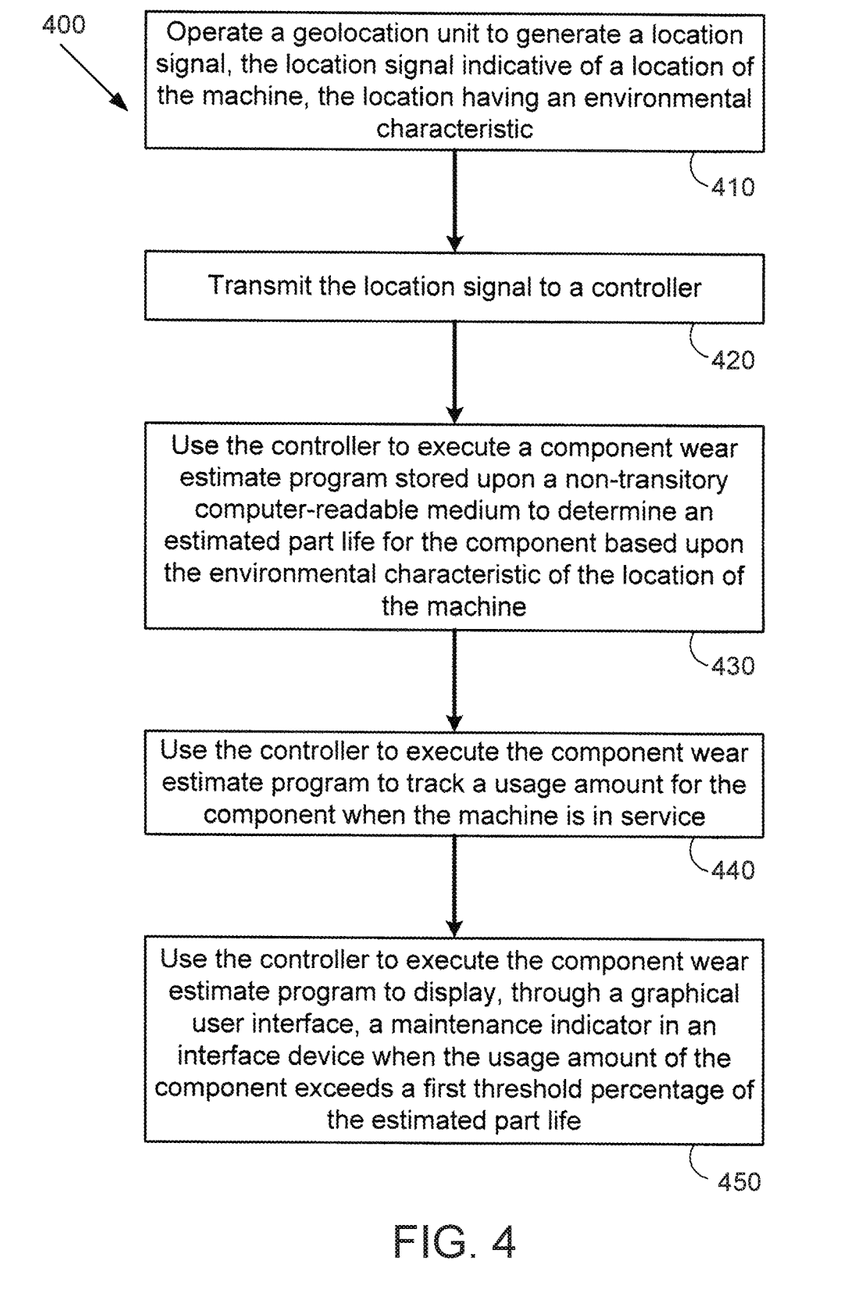
FIG. 4 is a flowchart illustrating steps of an embodiment of a method of estimating wear of a component of a machine following principles of the present disclosure.

In embodiments, an embodiment of a machine including a wear estimation system constructed according to principles of the present disclosure can be used to carry out a method of estimating wear of a component of a machine in accordance with principles of the present disclosure to determine an estimated part life for a component of the machine based upon at least one environmental characteristic of the machine's location. Referring to FIG. 4, steps of an embodiment of a method 400 of estimating wear of a component of a machine following principles of the present disclosure are shown.

In the method 400 of estimating wear, a geolocation unit is operated to generate a location signal (step 410). The location signal is indicative of a location of the machine. The location has an environmental characteristic. The location signal is transmitted to a controller (step 420). In embodiments, the geolocation unit comprises a GPS receiver that is configured to generate the location signal. In embodiments, the location signal includes a latitudinal position and a longitudinal position of the machine.

The controller is used to execute a component wear estimate program stored upon a non-transitory computer-readable medium to determine an estimated part life for the component based upon the environmental characteristic of the location of the machine (step 430). In embodiments, the environmental characteristic comprises a soil condition. In at least some of such embodiments, the soil condition comprises a soil granularity for the location. In embodiments, the environmental characteristic comprises a weather condition. In at least some of such embodiments, the weather condition comprises an average precipitation value for the location over a predetermined period of time.

In embodiments, the estimated part life determined by the controller is based upon an average time-to-full-wear value for a data set of historical wear measurements of a plurality of component installed in a corresponding set of other machines. The time-to-full-wear value can be calculated using the following equation:

$$\text{Time To Full Wear} = \frac{100\%}{\Delta\% \text{ Wear}/\Delta time}$$

where $\Delta\%$ Wear/$\Delta$time is calculated as a wear percentage difference between a pair of wear measurements for the component divided by a usage time difference between the pair of wear measurements.

The controller is used to execute the component wear estimate program to track a usage amount for the component when the machine is in service (step 440). The controller is used to execute the component wear estimate program to display, through a graphical user interface, a maintenance indicator in an interface device when the usage amount of the component exceeds a first threshold percentage of the estimated part life (step 440). In embodiments, the machine includes an operator compartment, and the interface device is mounted within the operator compartment. In embodiments, the method further includes displaying in the interface device, through the graphical user interface, the usage amount of the component as a percentage of the estimated part life used, a percentage of the estimated part life remaining, and/or hours of usage remaining, for example.

In embodiments of a method of estimating wear following principles of the present disclosure, the method of estimating wear can also include using the controller to activate, through the graphical user interface, a warning indicator when the usage amount of the component exceeds a second threshold percentage of the estimated part life which is higher than the threshold percentage used to trigger the maintenance indicator. In embodiments, the warning indicator includes at least one of a visible image and an audible sound.

In embodiments of a method of estimating wear following principles of the present disclosure, the machine includes a communication device that is in operable connection with the controller. The method of estimating wear can further comprise using the controller to transmit the maintenance indicator to a receiver via the communication device where the receiver is located off board of the machine. In embodiments, the communication device uses a cellular network to transmit estimated part life and/or usage data for one or more components of the machine to the receiver which is in the form of a smart phone having a mobile app loaded thereon to visibly display the estimated part life and/or usage data.

INDUSTRIAL APPLICABILITY

The industrial applicability of the embodiments of a machine, a wear estimation system, and a method of estimating wear of a component described herein will be readily appreciated from the foregoing discussion. The described principles are applicable to a variety of components. For example, components such as those used in an undercarriage and/or a final drive assembly of a ground-engaging member (e.g., a wheel) of a machine can be subjected to relatively harsh environmental conditions while in service resulting in various forms of wear and/or damage to the component. Using principles of the present disclosure, an estimated part life for a component of a machine can be determined that is based upon the actual environmental conditions encountered by the component when in service. Using principles of the present disclosure, a maintenance indicator can be triggered when the usage amount of a component exceeds a predetermined threshold of the estimated part life. The wear estimation system can be used to measure the life of a plurality of components of the machine, as one skilled in the art would appreciate.

To help avoid the productivity losses occurring when a component either is not repaired/replaced or is repaired/replaced too early in its life cycle, a wear estimation system following principles of the present disclosure can be used to more accurately predict when failure will occur and when maintenance should be performed on a machine component. Accordingly, a technician can use the estimated part life determined by the wear estimation system to make a more refined decision about when to perform maintenance, and what maintenance to perform. A more accurate determination of the actual lifespan of components of the machine based upon the environmental conditions to which it is actually subjected can help obtain a more efficient use of the component while helping to avoid unplanned downtime and potential damage to other parts of the machine from an unexpected component failure.

More accurate replacement part estimates generated by a wear estimation system constructed according to principles of the present disclosure can allow a machine user to receive a personalized life expectancy for the machine and its components. The machine user can use this information to plan for future maintenance, which can result in an improved user experience and decreased inspection cost for the user.

A component supplier can access estimated part life data generated by a wear estimation system installed in a machine via a mobile app or other remotely-located computer system through transmissions sent by a communication device of the system. By including the impact of environmental conditions (e.g., soil and weather conditions) experienced by a particular component in its estimated part life, the component supplier can make marketing/service contacts that more closely coincide with the time when components are actually worn and need replacing and can serve both machines that are regularly inspected and those that are not. An analysis method following principles of the present disclosure can be used to guide part sales to the uninspected machine population using a maintenance plan generated by the wear estimation system.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A machine comprising:
   a frame;
   an undercarriage, the undercarriage mounted to the frame;
   a component, the component comprising a part of, or supported by, one of the frame and the undercarriage;
   a wear estimation system, the wear estimation system supported by the frame, the wear estimation system including:
      a geolocation unit, the geolocation unit configured to generate a location signal, the location signal indicative of a location of the machine,
      a non-transitory computer-readable medium, the non-transitory computer-readable medium bearing environmental characteristic data associated with a plurality of geographic regions, and a component wear estimate program, the component wear estimate program including a graphical user interface,
      a controller, the controller in operable communication with the geolocation unit to receive the location signal therefrom, the controller in operable arrangement with the non-transitory computer-readable medium such that the controller is configured to execute the component wear estimate program contained thereon,
      an interface device, the interface device in operable communication with the controller, the interface device configured to display the graphical user interface of the component wear estimate program,
      wherein the component wear estimate program includes a wear estimate module, a tracking module, and a messaging module, the wear estimate module configured to identify an environmental characteristic of the location based at least partly on the location and the environmental characteristic data, and to determine an estimated part life for the component based upon the environmental characteristic of the location, the tracking module configured to track a usage amount for the component when the machine is in service, and the messaging module configured to display, through the graphical user interface, a maintenance indicator in the interface device when the usage amount of the component exceeds a first threshold percentage of the estimated part life.

2. The machine according to claim 1, further comprising:
   an operator compartment supported by the frame;
   wherein the interface device is mounted within the operator compartment.

3. The machine according to claim 1, wherein the wear estimation system further includes a communication device, the communication device in operable arrangement with the controller to communicatively transmit a wear estimate signal indicative of at least one of the estimated part life and the maintenance indicator to a receiver unsupported by the frame.

4. A wear estimation system for a component of a machine, the wear estimation system comprising:
   a geolocation unit, the geolocation unit configured to generate a location signal, the location signal indicative of a location of the machine;
   a non-transitory computer-readable medium, the non-transitory computer-readable medium bearing environmental characteristic data associated with a plurality of geographic regions, and a component wear estimate program, the component wear estimate program including a graphical user interface;
   a controller, the controller in operable communication with the geolocation unit to receive the location signal therefrom, the controller in operable arrangement with the non-transitory computer-readable medium such that the controller is configured to execute the component wear estimate program contained thereon;
   an interface device, the interface device in operable communication with the controller, the interface device configured to display the graphical user interface of the component wear estimate program;
   wherein the component wear estimate program includes a wear estimate module, a tracking module, and a messaging module, the wear estimate module configured to identify an environmental characteristic of the location based at least partly on the location and the environmental characteristic data, and to determine an estimated part life for the component based upon the environmental characteristic of the location, the tracking module configured to track a usage amount for the component when the machine is in service, and the messaging module configured to display, through the graphical user interface, a maintenance indicator in the interface device when the usage amount of the component exceeds a first threshold percentage of the estimated part life.

5. The wear estimation system according to claim 4, wherein the geolocation unit comprises a GPS receiver, and the location signal includes a latitudinal position and a longitudinal position.

6. The wear estimation system according to claim 4, further comprising:
   a data storage device, the data storage device in operable communication with the controller, the data storage device including a database comprising the environmental characteristic data;
   wherein identifying the environmental characteristic of the location comprises correlating, using the database, the location with one of the plurality of geographic regions.

7. The wear estimation system according to claim 6, wherein the data storage device further includes a database of time-to-full-wear values for a plurality of components installed in a corresponding set of other machines in which a time-to-full-wear value is calculated using:

$$\text{Time To Full Wear} = \frac{100\%}{\Delta\% \text{ Wear}/\Delta time}$$

where Δ % Wear/Δtime is calculated as a wear percentage difference between a pair of wear measurements for each of the plurality of components divided by a usage time difference between the pair of wear measurements; and wherein the wear estimate module of the component wear estimate program is configured to determine the estimated part life based upon the database of time-to-full-wear values.

8. The wear estimation system according to claim 6, wherein the environmental characteristic comprises a soil condition.

9. The wear estimation system according to claim 8, wherein the soil condition comprises a soil granularity for the location.

10. The wear estimation system according to claim 6, wherein the environmental characteristic comprises a weather condition.

11. The wear estimation system according to claim 10, wherein the weather condition comprises an average precipitation value for the location over a predetermined period of time.

12. A method of estimating wear of a component of a machine, the method of estimating comprising:
  operating a geolocation unit to generate a location signal, the location signal indicative of a location of the machine;
  transmitting the location signal to a controller;
  using the controller to execute a component wear estimate program stored upon a non-transitory computer-readable medium to identify an environmental characteristic of the location based at least partly on the location and environmental characteristic data associated with a plurality of geographic regions, the environmental characteristic data being stored upon the non-transitory computer-readable medium;
  using the controller to execute the component wear estimate program to determine an estimated part life for the component based upon the environmental characteristic of the location;
  using the controller to execute the component wear estimate program to track a usage amount for the component when the machine is in service; and
  using the controller to execute the component wear estimate program to display, through a graphical user interface, a maintenance indicator in an interface device when the usage amount of the component exceeds a first threshold percentage of the estimated part life.

13. The method of estimating wear according to claim 12, wherein the estimated part life determined by the controller is based upon an average time-to-full-wear value for a data set of historical wear measurements of a plurality of components installed in a corresponding set of other machines in which a time-to-full-wear value is calculated using:

$$\text{Time To Full Wear} = \frac{100\%}{\Delta\% \text{ Wear}/\Delta time}$$

where Δ % Wear/Δtime is calculated as a wear percentage difference between a pair of wear measurements for the component divided by a usage time difference between the pair of wear measurements.

14. The method of estimating wear according to claim 12, further comprising:
  using the controller to activate, through the graphical user interface, a warning indicator when the usage amount of the component exceeds a second threshold percentage of the estimated part life, the second threshold percentage being higher than the first threshold percentage, and the warning indicator including at least one of a visible image and an audible sound.

15. The method of estimating wear according to claim 12, wherein the machine includes an operator compartment, and the interface device is mounted within the operator compartment.

16. The method of estimating wear according to claim 12, wherein the machine includes a communication device, the communication device being in operable connection with the controller, the method of estimating wear further comprising:
  using the controller to transmit the maintenance indicator to a receiver via the communication device, the receiver being located off board of the machine.

17. The method of estimating wear according to claim 12, wherein the environmental characteristic comprises a soil condition.

18. The method of estimating wear according to claim 17, wherein the soil condition comprises a soil granularity for the location.

19. The method of estimating wear according to claim 12, wherein the environmental characteristic comprises a weather condition.

20. The method of estimating wear according to claim 19, wherein the weather condition comprises an average precipitation value for the location over a predetermined period of time.

* * * * *